(12) United States Patent
Kaluve et al.

(10) Patent No.: US 7,447,166 B1
(45) Date of Patent: Nov. 4, 2008

(54) METHOD TO DISTRIBUTE IEEE 802.1X AUTHENTICATED USERS AMONG MULTIPLE BROADCAST DOMAINS

(75) Inventors: Shyamasundar S. Kaluve, Santa Clara, CA (US); Ian Foo, Raleigh, NC (US); Shyam Murthy, Santa clara, CA (US); Ramesh Ponnapalli, Bangalore (IN); Rajasekhar Manam, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 737 days.

(21) Appl. No.: 10/979,536

(22) Filed: Nov. 2, 2004

(51) Int. Cl.
 *H04L 12/26* (2006.01)
(52) U.S. Cl. .................................. 370/254; 370/465
(58) Field of Classification Search ................. 370/254, 370/255, 465
See application file for complete search history.

(56) References Cited

U.S. PATENT DOCUMENTS

| | | | | |
|---|---|---|---|---|
| 6,590,861 | B1 * | 7/2003 | Vepa et al. | 370/216 |
| 6,976,088 | B1 * | 12/2005 | Gai et al. | 709/238 |
| 7,283,476 | B2 * | 10/2007 | Bare | 370/236 |
| 2003/0069972 | A1 * | 4/2003 | Yoshimura et al. | 709/226 |
| 2005/0053046 | A1 * | 3/2005 | Wang | 370/338 |
| 2005/0114507 | A1 * | 5/2005 | Tarui et al. | 709/224 |
| 2006/0067335 | A1 * | 3/2006 | Maya et al. | 370/397 |
| 2007/0244999 | A1 * | 10/2007 | Hamanaka et al. | 709/220 |
| 2008/0013481 | A1 * | 1/2008 | Simons et al. | 370/328 |
| 2008/0031263 | A1 * | 2/2008 | Ervin et al. | 370/397 |

OTHER PUBLICATIONS

Perlman, Radia, Interconnections Second Edition: Bridges, Routers, Switches, and Internetworking Protocols, Section 1.1: Layers, Addison Wesley, 1999, pp. 1-7.
IEEE Standard P802.1Q/D10, entitled Draft Standard P802.1Q/D10, IEEE Standards for Local and Metropolitan Area Networks: Virtual Bridged Local Area Networks, 1997, pp. 1-212.
IEEE Standard 802.1X-2001, entitled IEEE Standards for Local and Metropolitan Area Networks: Port-Based Network Access Control, 2001, pp. 1-134.
d-tec. Distributed Technologies GmbH, entitled 3- and n-Tier Architectures, 1998, pp. 1-6.
Passmore, D., et al., entitled The Virtual LAN Technology Report, 1996, Decisys, pp. 1-20.
Congdon, P., IEEE 802.1X Overview: Port Based Network Access Control, Mar. 2000, 11 Pgs.
Rigney, C., et al., RFC 2138, entitled Remote Authentication Dial in User Service (RADIUS), Network Working Group, Apr. 1997, pp. 1-61.

(Continued)

*Primary Examiner*—Melvin Marcelo
(74) *Attorney, Agent, or Firm*—Cesari and McKenna LLP

(57) ABSTRACT

A technique optimizes the distribution of authenticated users among a plurality of broadcast domains, such as virtual local area networks (VLAN). Users are dynamically assigned to different broadcast domains based on various factors, including but not limited to the number of authenticated users already participating in each broadcast domain, the available bandwidth in each broadcast domain, user classes associated with users participating in each broadcast domain, etc. Based on one or more of these factors, authenticated users are optimally distributed ("load balanced") among the plurality of broadcast domains, thereby reducing the amount of broadcast traffic and configuration within each domain.

23 Claims, 9 Drawing Sheets

OTHER PUBLICATIONS

Zorn, G., et al., RFC 2868, entitled RADIUS Attributes for Tunnel Protocol Support, Network Working Group, Jun. 2000, pp. 1-19.

Congdon, P., et al., RFC 3580, entitled IEEE 802.1X Remote Authentication Dial in User Service (RADIUS) Usage Guidelines, Network Working Group, Sep. 2003, pp. 1-29.

* cited by examiner

| TABLE OF VLAN STATISTICS 500 | |
|---|---|
| VID 520 | NUMBER OF USERS 530 |
| 1 | 17 |
| 2 | 29 |
| ⋮ | ⋮ |

FIG. 5

TABLE OF VLAN GROUP 800

| GID 820 | VID 830 |
|---|---|
| 1 | 1, 2 |
| 2 | 2, 4, 5 |
| ⋮ | ⋮ |

METHOD TO DISTRIBUTE IEEE 802.1X AUTHENTICATED USERS AMONG MULTIPLE BROADCAST DOMAINS

FIELD OF THE INVENTION

This invention relates generally to assigning users to multiple broadcast domains, and, more specifically, to efficiently distributing IEEE 802.1X authenticated users among a plurality of virtual local area networks (VLAN).

BACKGROUND OF THE INVENTION

A computer network is a geographically distributed collection of interconnected subnetworks for transporting data between nodes, such as computers. The network's topology is defined by an arrangement of client nodes that communicate with one another, typically through one or more intermediate nodes. As used herein, a client node is an endstation node that is configured to originate or terminate communications over the network. In contrast, an intermediate node is a network node that facilitates routing data between client nodes. Communications between nodes are typically effected by exchanging discrete packets of data according to predefined protocols. In this context, a protocol consists of a set of rules defining how the nodes interact with each other.

Each data packet typically comprises "payload" data prepended ("encapsulated") by at least one network header formatted in accordance with a network communication protocol. The network headers include information that enables the client nodes and intermediate nodes to efficiently route the packet through the computer network. Often, a packet's network headers include at least a data-link (layer 2) header and an internetwork (layer 3) header, as described by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

Client nodes may be configured to communicate over various types of networks, ranging from local area networks (LANs) to wide area networks (WANs). LANs typically connect client nodes over dedicated private communications links located in the same general physical location, such as in a home or an office building. WANs typically connect large numbers of geographically dispersed nodes over long-distance communications links, such as common carrier telephone lines. The Internet is an example of a WAN that connects disparate networks throughout the world, providing global communication between nodes contained in various networks.

A LAN may be operated as a broadcast domain in which each node can transmit data to every other node in the domain. For example, an Ethernet LAN may be implemented as a broadcast domain where each device in the LAN is coupled to all other devices by a shared transmission medium. Data packets in a broadcast domain are usually addressed to particular destination nodes in the domain, although packets also may be "broadcast" to every node in the domain or "multicast" to a selected subset of the nodes. In practice, a broadcasted packet may contain network topology information used to configure routing operations within the broadcast domain. Such topology information may be formatted in accordance with a conventional link-state protocol, such as the Open Shortest Path First (OSPF) protocol. Other network control information also may be broadcast or multicast among the nodes to optimize network traffic in the domain.

Management of a LAN may be simplified by arranging its network nodes in a three-tier hierarchy having separate nodes dedicated to providing user services (client tier), application functionality (application tier) and data storage (data tier). In this way, management of any one tier can be isolated from the other tiers. The client tier comprises a group of client nodes that are responsible for controlling the user interface and receiving user events. Thus, users interact and communicate with one another through nodes in the client tier. The application tier contains network nodes that provide software applications and services which may be accessed by client nodes in the client tier. The data tier comprises a set of network nodes that provide a consistent set of data and file services to nodes in the application tier. To that end, the application tier may be configured to employ conventional database management functionality.

Typical LANs comprise a set of client nodes coupled to at least one intermediate node. The intermediate node is a computer that includes a plurality of network access ports ("ports") which are coupled via LAN segments or point-to-point links to other client and/or intermediate nodes. For instance, a port may provide a point of attachment to a LAN segment either by physically connecting the port to the LAN (i.e., a physical port) or logically associating the port with the LAN (i.e., a logical port). In general, each port is configured to communicate over a corresponding type of network or subnetwork, such as an asynchronous transfer mode (ATM) network, synchronous optical network (SONET), wireless network, frame relay network, Ethernet network, token ring network, Fiber Distributed Data Interface (FDDI) network, etc.

One or more intermediate nodes are often used to couple different LANs together, thereby allowing information to be exchanged among the interconnected LANs. For example, an intermediate node may function as a bridge which provides layer-2 "switching" functions between two or more LANs or client nodes. These functions include receiving a data packet at a first port and re-directing the packet to an appropriate destination port based on the contents of the packet's data-link header. Other intermediate nodes, such as routers, operate at higher layers within the protocol stack. Accordingly, a router may receive a data packet at a first port and then perform an address-lookup function using a destination address contained in the packet's internetwork header. The router determines over which destination port to transmit the data packet based on the result of the address-lookup operation.

Virtual Local Area Networks (VLANs)

A computer network may be segmented into one or more logical networks. That is, each logical network may include one or more network nodes which communicate with one another as though they reside on the same LAN even though at least some of the nodes may be located on different physical LAN segments. As such, each logical grouping of network nodes essentially functions as a "virtual" local area network (VLAN). Thus, a VLAN generally may be thought of as a broadcast domain in which every node in the VLAN, although not geographically located in the same physical LAN, can communicate with every other node in the VLAN.

In a typical arrangement, an intermediate node, such as a router or switch, associates a client node with a particular VLAN based on which intermediate-node port is coupled to the client node. For instance, the intermediate node may contain three ports P1, P2 and P3 which have been respectively assigned to the VLANs A, B and C. In this case, client nodes coupled to the port P1 are associated with the VLAN A, clients coupled to the port P2 are associated with the VLAN B and clients coupled to the port P3 are associated with the VLAN C. In general, any number of intermediate-node ports may be associated with the same VLAN. For example, the ports P1 and P3 both may be associated with the VLAN A. Similarly, some ports in the intermediate node may not be assigned to any VLAN. Although client nodes may be logically grouped into different VLANs based on their port associations (as described herein for purposes of discussion), those skilled in the art will also understand that the client nodes alternatively may be associated with VLANs based on other criteria, such as the clients' Media Access Control (MAC) groupings, Internet Protocol (IP) multicast groups, network-layer groupings, etc.

In many cases, it may be desirable to interconnect a plurality of intermediate nodes to extend the VLAN associations of ports in the network. Those network ports having the same VLAN designation function as if they participate in the same LAN. VLAN-configured switches and bridges are specifically configured to prevent message exchanges between ports assigned to different VLANs, thereby preserving the logical boundaries of each VLAN. Nonetheless, intermediate nodes, such as routers, operating above layer-2 can relay messages between different VLAN segments.

The Institute of Electrical and Electronics Engineers' (IEEE) promulgated a widely used standard entitled "Virtual Bridged Local Area Networks" (IEEE Std. 802.1Q) which is directed towards processing VLAN packets. To preserve VLAN associations of messages transported across trunks or links in VLAN-aware networks, the IEEE 802.1Q standard discloses including a VLAN identifier (VID) in the messages to associate the messages with their respective VLANs. The VID field defined by the IEEE 802.1Q standard is a 12-bit value that supports up to 4096 different VLANs. An intermediate node usually stores a mapping of VID values with selected ports and associates those VID values with messages transmitted through the selected ports. In other words, every time a message is received on a given port, the VID value (if one exists) for that port is incorporated into the message.

IEEE 802.1X Port-Based Network Access Control

Computer-network security often requires end users to authenticate before they are permitted to access the network. In this way, the network is protected from unauthorized users. In networks where client nodes are connected to dedicated intermediate-node ports, a user at a given client node may be authenticated at the intermediate-node port coupled to that client node. In such a port-based authentication scheme, each intermediate-node port assumes one of two possible states: "open" or "closed." Initially, the port's state is closed, thereby preventing users at its attached client node from accessing the network. However, after a user is authenticated at the port, the port changes to an open state. The open port enables the authenticated user to access the network. Besides providing access to the network, the open port also may provide other specialized services, such as enhanced quality of service, that are not available through the port in its closed state.

A popular technique for implementing this type of conventional port-based security is described in IEEE standard entitled "Port-based Network Access Control" (IEEE Std 802.1X-2001), published July 2001, which is hereby incorporated by reference as though fully set forth herein. In this standard, a client node executes a "Supplicant" port access entity (PAE) at a client-node port, and an intermediate node executes an "authenticator" PAE at an intermediate-node port coupled to the client-node port. The Supplicant and Authenticator PAEs are configured to transmit and receive data packets formatted in accordance with the 802.1X standard.

The intermediate node's port is initially in an uncontrolled state (i.e., a "closed" state), whereby all client-node communications at the port are directed to the Authenticator PAE. The Supplicant PAE at the client node generates an 802.1X authentication request to change the intermediate node's port to a controlled state (i.e., an "open" state). As per the 802.1X standard, the request is formatted according to the Extensible Authentication Protocol (EAP) and encapsulated in a conventional IEEE 802 data frame. Advantageously, the EAP protocol is a generic protocol capable of supporting various different authentication techniques. Thus, the Supplicant PAE may generate the 802.1X authentication request in accordance with any authentication method consistent with the EAP protocol. When the client node and intermediate node are connected via a shared LAN segment, the Supplicant PAE formats the request as an EAP over LAN (EAPOL) packet and forwards it to the intermediate node.

At the intermediate node, the EAPOL packet is received by the Authenticator PAE, which processes and forwards the 802.1X authentication request to an appropriate authentication service, such as a Remote Authentication Dial-In User Service (RADIUS). The RADIUS authentication service is described in more detail in Request for Comments (RFC) 2138, entitled "Remote Authentication Dial-In User Service (RADIUS)," published April 1997, which is hereby incorporated by reference as though fully set forth herein. The RADIUS service is typically accessible to the Authenticator PAE via a pre-determined transport-layer port, such as the User Datagram Protocol (UDP) port number 1812, opened in a remote authentication server.

The payload of the authentication request sent to the RADIUS server includes a conventional "Access-Request" RADIUS message. The Access-Request message contains information, usually formatted as one or more RADIUS "Attributes," that the RADIUS service uses to determine whether the requesting Authenticator PAE is permitted to open its intermediate-node port to the user. The Attributes may include, for example, the user's name, password, user class, intermediate-node port identifier, client-node identifier, and so forth. RADIUS Attributes and their corresponding formats are generally described in more detail in the RFC 2138 which has been incorporated by reference above.

Using the RADIUS Attributes received in the Authenticator PAE's Access-Request message, the RADIUS service provides authentication, authorization and accounting (AAA) functions to determine whether the user is authorized to communicate at the intermediate-node port. In some cases, these AAA procedures may require that a sequence of challenge-response exchanges be performed between the RADIUS service and the user. Upon completion of its AAA procedures, the RADIUS service notifies the Authenticator PAE of the user's authentication state.

If the user has been authenticated by the RADIUS service, then the service returns an "Access-Accept" message to the Authenticator PAE. In this case, the Authenticator PAE changes the intermediate-node port's state to controlled, thereby enabling the user to access the network and possibly other intermediate-node services as well. Otherwise, the RADIUS service forwards the Authenticator PAE an "Access-Reject" message indicating that the user is not authorized to access the network through the intermediate-node port. In such a scenario, the intermediate node's port remains in an uncontrolled state. This 802.1X authentication process is typically repeated periodically to verify that the user's authentication state at the intermediate-node port has not changed, e.g., from authenticated to unauthenticated.

802.1X Port-Based Network Access Control using VLANs

The RADIUS service has been extended to authenticate users over different "tunnels" accessible to the users. In this context, a tunnel is a secured communication channel in which packets are encrypted or encapsulated when they enter the tunnel and are decrypted or decapsulated upon exiting. For example, common tunneling protocols include, inter alia, the Layer Two Tunneling Protocol (L2TP) and the Point-to-Point Tunneling Protocol (PPTP). In operation, the RADIUS service may be configured, e.g., by a system administrator, to associate authenticated users with one or more tunnels over which they are permitted to communicate. For instance, the RADIUS service may associate a first authenticated user with a particular L2TP tunnel and a second authenticated user with a PPTP tunnel. Some users may be authenticated by the RADIUS service to communicate over more than one tunnel, e.g., both the L2TP and PPTP tunnels. RFC 2868, entitled "RADIUS Attributes for Tunnel Protocol Support," dated June 2000, which is hereby incorporated by reference as though fully set forth herein, describes a set of Tunnel Attributes that the RADIUS service may use to identify which tunnels are accessible to an authenticated user. As noted in RFC 2868, the RADIUS service may disseminate the user's associated Tunnel Attributes in a conventional Access-Request, Access-Accept and/or Access-Reject message. In practice, the Tunnel Attributes are most often included in Access-Accept messages created by the RADIUS service after the user has been authenticated.

The RADIUS Tunnel Attributes include, among other things, a Tunnel-Type Attribute, a Tunnel-Medium-Type Attribute, Tunnel-Private-Group-ID Attribute and a Tunnel-Preference Attribute. The Tunnel-Type Attribute (RADIUS Attribute number 64) indicates a tunneling protocol type, such as L2TP or PPTP. The Tunnel-Medium-Type Attribute (RADIUS Attribute number 65) identifies a type of transport medium, such as conventional IEEE 802 Ethernet media. The Tunnel-Private-Group-ID Attribute (RADIUS Attribute number 81) indicates a group identifier (ID) that correlates a tunneled session with a particular group of users. The Tunnel-Preference Attribute (RADIUS Attribute number 83) specifies a tunnel preference in the event that more than one tunnel is available to an authenticated user, e.g., the user is associated with multiple Tunnel-Type Attributes.

The RADIUS Tunnel Attributes described above have been used to adapt the IEEE 802.1X port-authentication protocol for use with VLANs. To that end, the RADIUS service may notify an Authenticator PAE that a user is authenticated to participate in one or more VLANs by including a Tunnel-Type Attribute storing a predetermined value (e.g., 13) in the user's Access-Accept message. Further, the Access-Accept message also may include a Tunnel-Medium-Type Attribute whose value indicates over which type of VLAN transport medium the user is authenticated to communicate.

The particular VLAN for which the user is authenticated may be indicated by a VID value stored in a Tunnel-Private-Group-ID Attribute included in the Access-Accept message. If the user is authenticated for more than one VLAN, the Access-Accept message may contain a plurality of Tunnel-Private-Group-ID Attributes, each storing a different VID value. In such a case, the Access-Accept message also may contain a Tunnel-Preference Attribute that identifies which VID value corresponds to a "preferred" VLAN. The use of RADIUS Tunnel Attributes used to make the IEEE 802.1X protocol compatible with VLAN topologies is described in more detail in the RFC 3580, entitled "IEEE 802.1X Remote Authentication Dial In User Service (RADIUS) Usage Guidelines," dated September 2003, which is hereby incorporated by reference as though fully set forth herein.

Modern computer networks supporting VLANs are increasingly adopting the IEEE 802.1X port-based authentication standard using RADIUS Tunnel Attributes, as described above. Each VLAN typically corresponds to a set of users belonging to a particular user group, such as an engineering group, marketing group, finance group, etc. Depending on the size of the user groups, the number of users participating in a given VLAN may become quite large, e.g., on the order of hundreds or thousands of users. However, problems often arise when too many 802.1X authenticated users are assigned to the same VLAN, i.e., an "over-subscribed" VLAN.

For example, the amount of broadcast traffic within a VLAN may become prohibitive when the VLAN contains a large number of communicating users. More specifically, network bandwidth and system resources may become exhausted by the relatively large amounts of broadcast traffic. Moreover, the process of configuring and managing the relatively large number of 802.1X authenticated users in the VLAN may consume excessive amounts of time and administrative resources. This may be true even in highly-structured networks, such as three-tiered networks, where network nodes in different tiers are separately configured. Such configuration complexities also may be a problem when a large number of users participate in VLANs deployed in a 802.1X-configured wireless LAN, such as a campus or enterprise LAN, having a large number of wireless users.

A previous solution for managing an over-subscribed VLAN involves partitioning the VLAN into multiple smaller VLANs, each partitioned VLAN having the same characteristics, such as the same user-access privileges, network-communication protocols, etc. as the original VLAN. By way of example, consider an over-subscribed VLAN A that may be partitioned into two smaller VLANs A' and A". A system administrator may manually configure the network's RADIUS service to authenticate a first set of users in the VLAN A' and a second set of users in the VLAN A". As such, the RADIUS service may only assign each authenticated user to the VLAN that was predetermined for that user by the system administrator. In many enterprise networks, administrators currently attempt to limit the number of users that they assign to the same VLAN, e.g., less than 200 users per VLAN, to reduce the effects of broadcast traffic and configuration complexities.

Although this prior-art technique of statically assigning users, e.g., to the VLANs A' and A", may be effective for controlling the number of users in each VLAN, it often does not result in optimal load distribution, e.g., either in terms of VLAN population and/or bandwidth utilization. Further, the process of statically assigning users to VLANs involves a substantial amount of configuration overhead, especially in networks where the number or types of users may be dynamically changing. It is therefore generally desirable to more efficiently assign 802.1X authenticated users to different VLANs.

SUMMARY OF THE INVENTION

The present invention overcomes the disadvantages of the prior art by providing a technique that optimizes the distribution of authenticated users among a plurality of broadcast domains, such as virtual local area networks (VLAN). Users are dynamically assigned to different broadcast domains based on various factors, including but not limited to the number of authenticated users already participating in each broadcast domain, the available bandwidth in each broadcast domain, user classes associated with users participating in each broadcast domain, etc. Based on one or more of these factors, authenticated users are optimally distributed ("load balanced") among the plurality of broadcast domains, thereby reducing the amount of broadcast traffic and configuration within each domain.

In an illustrative embodiment, a user is authenticated by an 802.1X Authenticator PAE which communicates with a RADIUS service. Upon authenticating the user, the RADIUS service forwards an Access-Accept message to the Authenticator PAE. The Access-Accept message may identify multiple VLANs for which the user is authenticated to participate; alternatively the Access-Accept message may identify a single VLAN "group" which includes a plurality of VLANs associated with the authenticated user. In response to receiving this Access-Accept message, the Authenticator PAE selects one of the VLANs identified by the RADIUS service and assigns the authenticated user to the selected VLAN. Unlike prior implementations, the Authenticator PAE dynamically selects the user's VLAN so as to optimally distribute 802.1X authenticated users among the available VLANs. To that end, the Authenticator PAE may select the user's VLAN based on one or more factors, such as the number of authenticated users already participating in each VLAN, the available bandwidth in each VLAN, user classes associated with authenticated users participating in each VLAN, etc.

Advantageously, because authenticated users are dynamically load balanced among multiple broadcast domains, each of the broadcast domains is less likely to become over-subscribed, e.g., in terms of user population and/or available bandwidth. As such, network bandwidth is used more efficiently and VLAN configuration is simplified without having to modify existing network infrastructure.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an exemplary table configured to store statistics associated with a plurality of VLANs;

FIG. 8 is a schematic block diagram of an exemplary table configured to map VLAN group identifier (GID) values with corresponding sets of VLAN identifier (VID) values.

DETAILED DESCRIPTION OF ILLUSTRATIVE EMBODIMENTS

Figure 1:
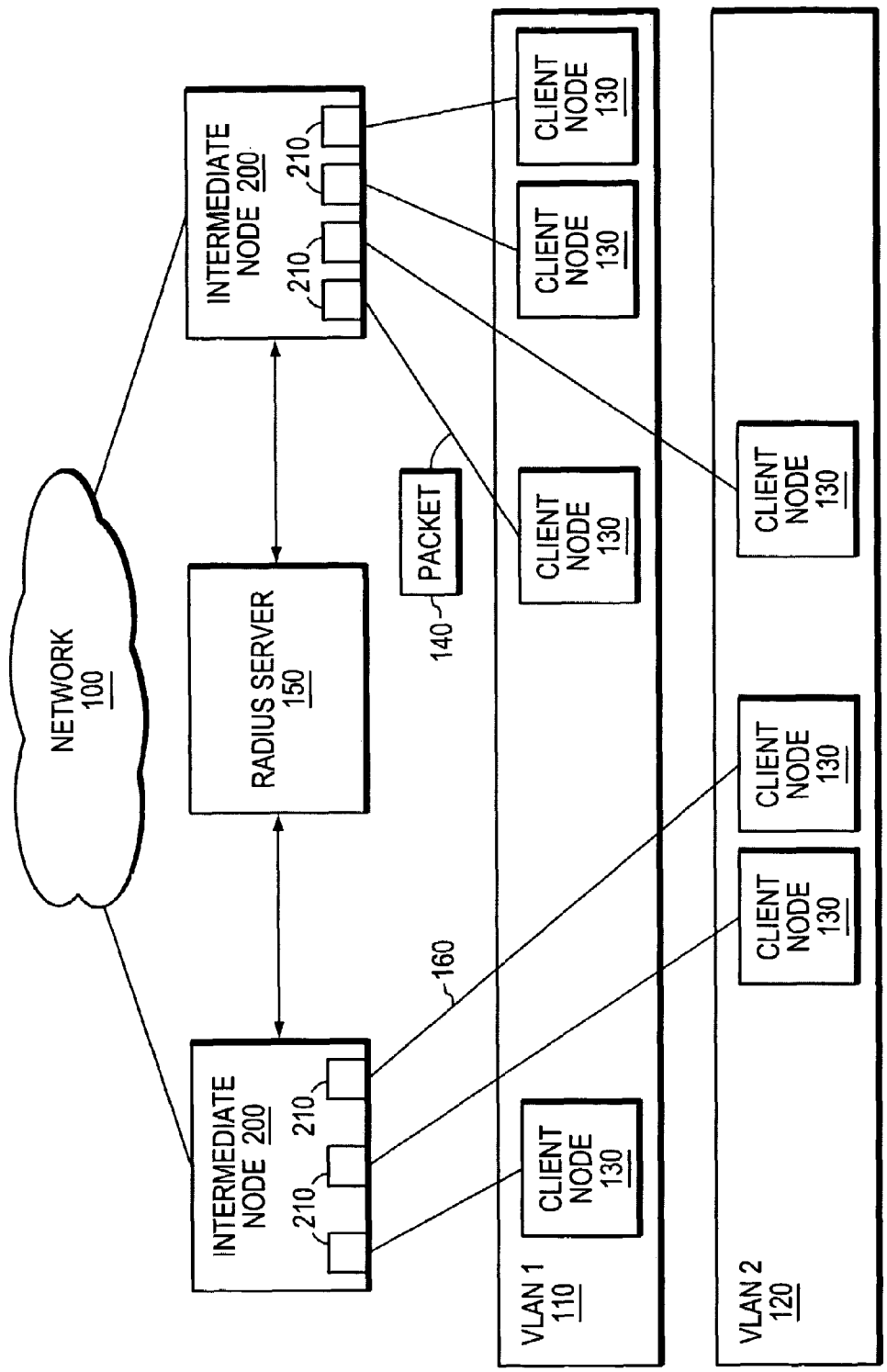
FIG. 1 is a schematic block diagram of an exemplary computer network that may be used to implement the illustrative embodiments of the invention.

FIG. 1 illustrates a computer network 100 including a set of intermediate nodes 200 configured to support one or more VLANs, such as the VLANs 110 and 120. Each intermediate node 200 contains at least one port 210 coupled to a corresponding client node 130. The client nodes typically communicate with their interconnected intermediate-node ports by exchanging discrete data packets 140, such as conventional TCP/IP data packets, over local area networks or point-to-point links 160 connected to the ports 210. The client nodes 130 may be logically grouped in different VLANs. For example, as shown, a first group of client nodes is assigned to the VLAN-1 110 and a second set of client nodes is assigned to the VLAN-2 120.

The intermediate nodes 200 may implement the IEEE 802.1X port-authentication standard to ensure that users at the client nodes 130 are authorized to access the network 100 and participate in the VLANs 110 and 120. The 802.1X standard also may be used to determine which users are authorized to access other services provided by the intermediate nodes. In practice, a client node may generate a 802.1X request to authenticate a user at that client node. The request may contain, among other things, the user's name, password, user class and/or other authentication information. The 802.1X request is sent to an appropriate intermediate-node port 210 coupled to the requesting client node. The intermediate node that receives the client's 802.1X request, in turn, forwards the request to a RADIUS service 150, e.g., located in a remote authentication server.

If the RADIUS service determines that the user is authenticated to communicate over the intermediate-node port 210, the RADIUS service returns an Access-Accept message to the intermediate node. The Access-Accept message may specify one or more VLANs for which the user is authorized to participate. Alternatively, the message may indicate a particular group of VLANs, where the user is authorized to participate in any VLAN within the group. After receiving the Access-Accept message, the intermediate node "opens" the port to the authenticated user and, when appropriate, associates the intermediate-node port with the user's VLAN. When the RADIUS service authenticates the user to participate in multiple VLANs, the intermediate node may employ a novel VLAN-selection process, in accordance with the illustrative embodiments described herein, to select which VLAN to associate with the port 210. In the event that the RADIUS service does not authenticate the user, i.e., the RADIUS service issues an Access-Reject message, the intermediate node's port 210 remains in a "closed" state and the user is not permitted to access the network 100 or any services that are otherwise available upon user authentication.

Figure 2:
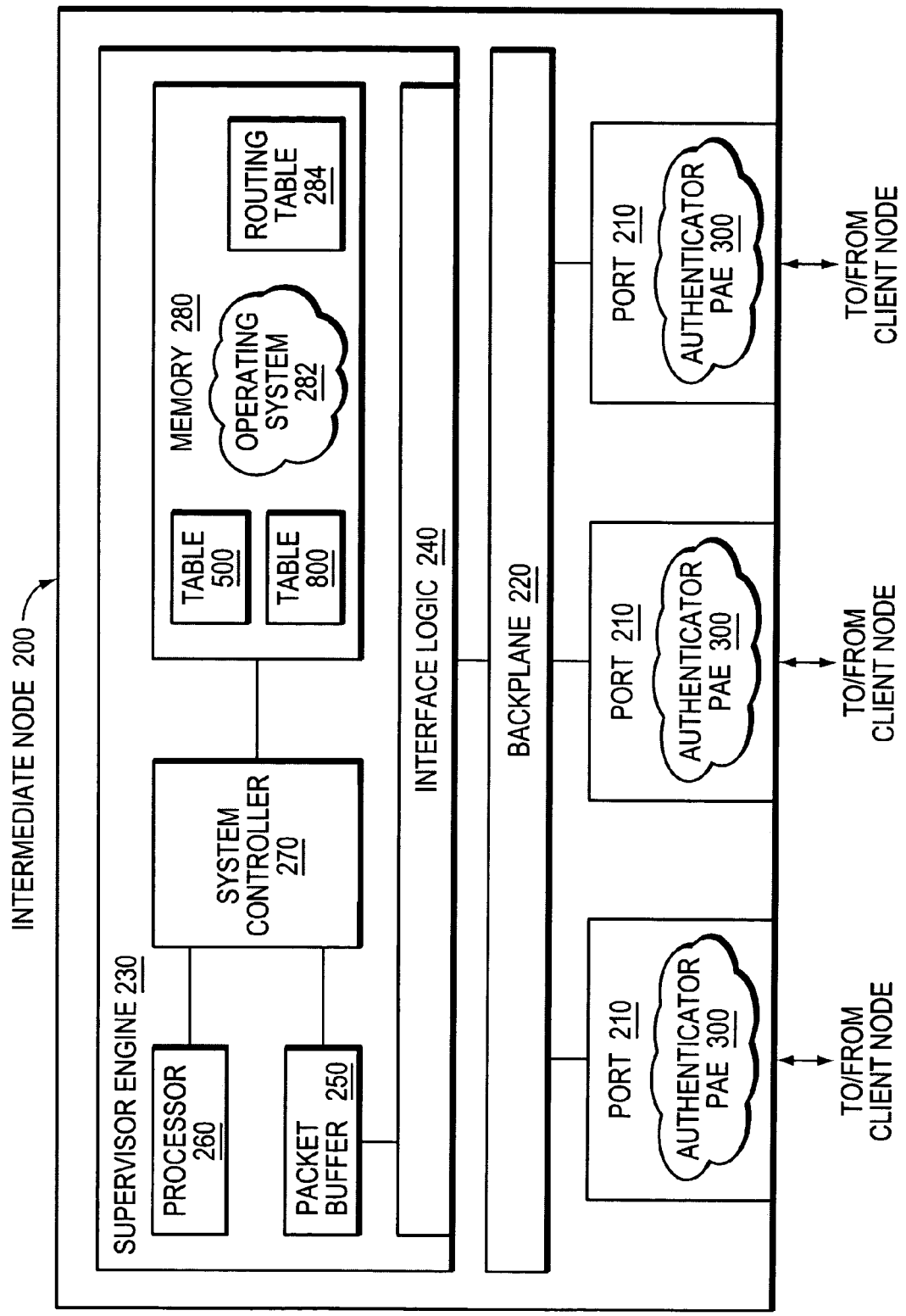
FIG. 2 is a schematic block diagram of an illustrative intermediate node that may be deployed in the computer network of FIG. 1.

FIG. 2 is a schematic block diagram of an exemplary intermediate node 200, such as a switch or router, that may be advantageously used with the present invention. Suitable intermediate nodes that may be used with the present invention include the Cisco 7200 and 7600 Series Routers and Catalyst 6500 Series Switches available from Cisco Systems Incorporated, San Jose, Calif. The intermediate node 200 comprises one or more ports 210 and a supervisor engine 230 interconnected by a backplane 220. The node 200 is configured to perform, inter alia, various layer-2 (data-link layer) and layer-3 (inter-network layer) switching and routing functions including forwarding and processing data packets in accordance with the inventive technique. The intermediate node 200 also may be configured to support various combinations of conventional routing and switching protocols known in the art.

The backplane 220 comprises a point-to-point interconnect fabric that interconnects the various ports 210 and allows data and signals to be transferred from one port to another. Each port 210 may be a physical or logical interface that connects the intermediate node 200 with a corresponding client node 130. To that end, the ports may be adapted to transfer and acquire data packets 140 to and from various transport media such as, e.g., Fast Ethernet (FE), Gigabit Ethernet (GE), wireless links, optical links, etc. Functionally, the ports 210 may be configured to communicate using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The supervisor engine 230 comprises circuitry and logic configured to manage the switching and routing operations performed by the intermediate node 200. The supervisor engine comprises interface logic 240, a packet buffer 250, a processor 260, a system controller 270 and a memory 280. The interface logic 240 is coupled to the backplane 220 and is configured to transfer data between the backplane and the supervisor engine 230. The packet buffer 250 is a conventional packet memory comprising random access memory (RAM) devices capable of storing data packets 140 acquired by the interface logic 240 and processed by the processor 260. The processor 260 is a general-purpose or special-purpose central processing unit (CPU) configured to execute computer-readable instructions stored in the memory 280. The system controller 270 is coupled to the processor 260, memory 280 and packet buffer 250. The system controller comprises logic and circuitry that enables the processor 260 to access (e.g., read, write) memory locations contained in the packet buffer 250 and the memory 280.

The memory 280 preferably comprises a form of RAM that is generally cleared by a power cycle or other reboot operation (e.g., it is a "volatile" memory). For instance, the memory may comprise dynamic RAM (DRAM) and/or synchronous DRAM (SDRAM) storage locations adapted to store program code and data structures accessible to the processor 260 via the system controller 270. It will be apparent to those skilled in the art that the memory 280 also may comprise other memory means, including various computer-readable media, for storing program instructions and data structures pertaining to the operation of the intermediate node 200. Further, those skilled in the art will appreciate that at least some portions of the memory 280 may be embodied as electromagnetic signals that are transmitted from a remote memory element to the supervisor engine 230.

The memory 280 stores, among other things, computer-readable instructions for implementing an operating system 282 that functionally organizes the intermediate node 200 by, e.g., invoking network operations in support of software processes and services executing on the processor 260. The IOS™ operating system by Cisco Systems Incorporated is one example of an operating system 282 that may be stored in the memory 280 and executed in accordance with the illustrative embodiments herein. The operating system 282 may manage a set of forwarding (adjacency) information stored in one or more routing tables 284 in the memory 280. Thus, forwarding decisions for received data packets 140 may be rendered based on the contents of the routing table 284. In addition, the memory 280 also may store other data structures, such as the tables 500 and 800, and computer-readable instructions that advantageously may be used to implement the present invention.

Each intermediate-node port 210 may be associated with a corresponding Authenticator port access entity (PAE) 300 that implements the 802.1X port-authentication protocol at the intermediate node 200. The Authenticator PAEs may be executed by circuitry or logic resident on line cards containing the ports 210. Alternatively, the Authenticator PAEs may be executed by the processor 260 in the supervisor engine 230 or by any other processing element associated with the ports 210. Accordingly, computer-readable instructions corresponding to an Authenticator PAE 300 may be stored in a local line-card memory (not shown) or in the "main" memory 280, or in any combination of storage elements.

Figure 3:
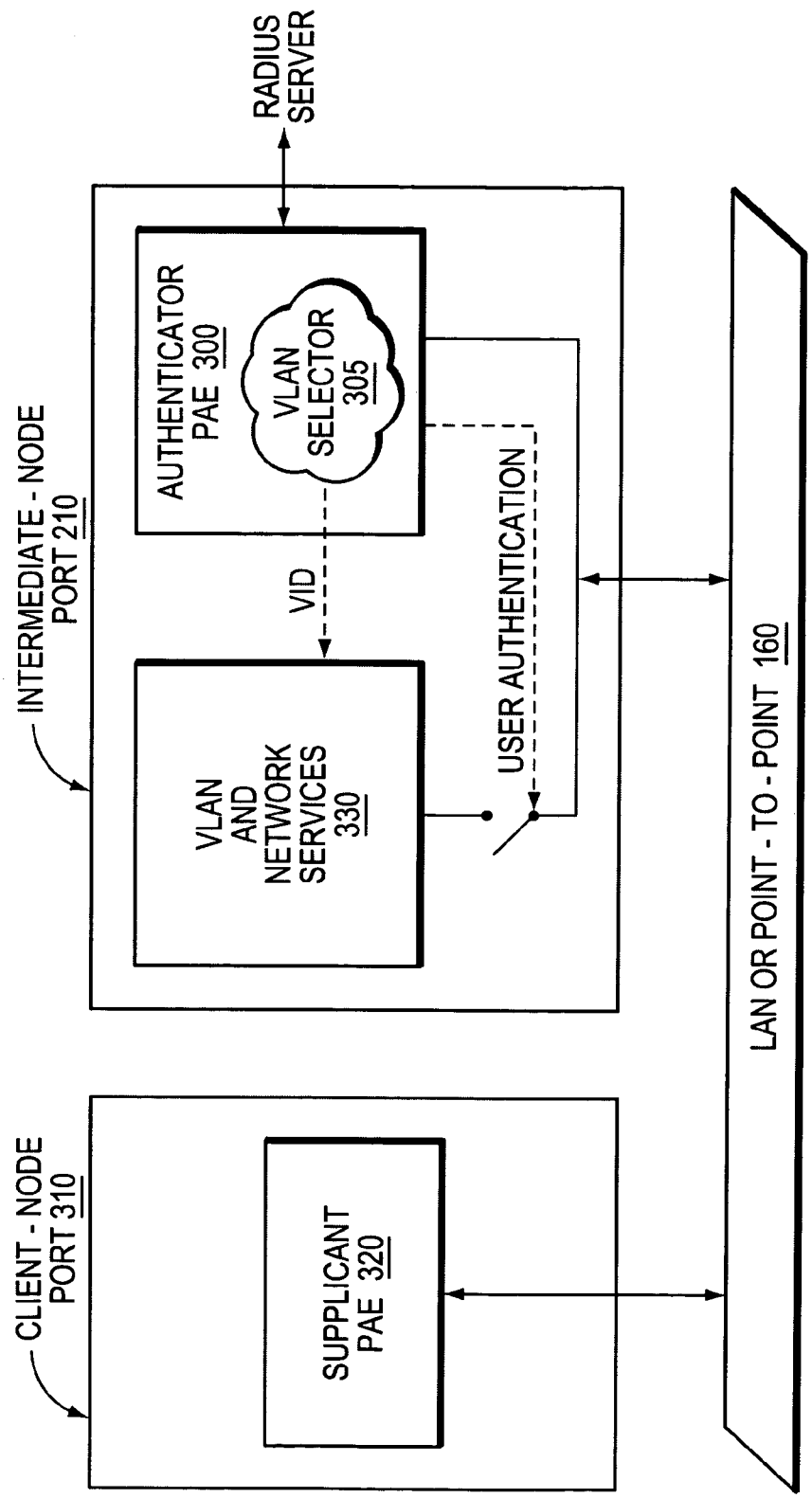
FIG. 3 is a schematic block diagram including an illustrative Authenticator port access entity (PAE) which may be used to implement the 802.1X port-based authentication protocol in accordance with the illustrative embodiments.

FIG. 3 is a schematic block diagram of an intermediate-node port 210 configured to implement IEEE 802.1X port-based network access control in accordance with the illustrative embodiments. As shown, the port 210 is coupled over a LAN or point-to-point link 160 to a port 310 in a client node 130. The client node executes a Supplicant PAE 320 associated with the client-node port 310, and the intermediate node 200 executes an Authenticator PAE 300 associated with the intermediate-node port 210. When a user at the client node attempts to be authenticated at the intermediate node, e.g., to gain access to the network 100, the Supplicant PAE 320 transmits a 802.1X authentication request to the Authenticator PAE 300.

After receiving the user's 802.1X request, the Authenticator PAE 300 may reformat the request and forward it to the RADIUS service 150. The RADIUS service cooperates with the Authenticator PAE 300 and the Supplicant PAE 320 to determine the user's authentication state. To that end, the RADIUS service may engage in a sequence of challenge-response exchanges with the client node (or the user at the client node) via the Supplicant and Authenticator PAEs. Illustratively, at the end of the authentication process, the RADIUS service determines whether the user is authenticated to communicate over the port 210. If the user is not authenticated to access the port 210, the RADIUS service issues an Access-Reject message, thereby notifying the Authenticator PAE 300 that the user's authentication attempt failed. When the user is authenticated by the RADIUS service 150, an Access-Accept message is returned to the Authenticator PAE 300 which, in response to receiving the message, enables the user to access network services 330 at the intermediate-node port 210.

The Access-Accept message also may notify the Authenticator PAE that the user is authorized to participate in one or more VLANs. For instance, a system administrator may configure the RADIUS service to correlate the user with the one or more VLANs, and the RADIUS service may specify those VLANs in the user's Access-Accept message using an appropriate set of RADIUS Tunnel Attributes. Operationally, a VLAN-selector process 305, e.g., executing in the Authenticator PAE 300, determines which VLAN(s) are included in the received Access-Accept message and dynamically selects one of the VLANs for the authenticated user. After selecting a VLAN, the VLAN-selector process 305 associates the VLAN ID (VID) value corresponding to the selected VLAN with the intermediate-node port 210. Thereafter, the authenticated user may access the selected VLAN through the port 210 and packets 140 transmitted and received at the port may be tagged with the port's VID value.

In accordance with the illustrative embodiments, the VLAN-selector process 305 is configured to dynamically select a VLAN so as to optimally distribute ("load balance") 802.1X users among a set of VLANs. Specifically, the VLAN-selector process 305 may select the user's VLAN based on various factors, such as the number of authenticated users already participating in each VLAN, the available bandwidth in each VLAN, user-class populations in each VLAN, etc. Preferably, the VLAN-selector process 305 is configured to select the "least populated" VLAN available to the authenticated user. In a simple case, the least-populated VLAN may be the VLAN having the fewest number of participating users. Alternatively, the least-populated VLAN may be selected as the VLAN having the most available bandwidth. In other cases, the VLAN-selector process 305 may select a least-populated VLAN based on a more complicated function of user attributes. For instance, the least-populated VLAN may be selected based on a function of unused bandwidth in each VLAN, user-class populations in each VLAN, number of users participating in each VLAN, etc.

A. First Illustrative Embodiment

Suppose the RADIUS service 150 has been configured, e.g., by a system administrator, to authenticate a particular user to participate in an over-subscribed VLAN that has been partitioned into two smaller VLANs, e.g., VLANs 110 and 120. In such a scenario, the RADIUS service may issue an Access-Accept message indicating that the authenticated user may participate in either of the VLANs 110 or 120. In this example, it is assumed that each of the partitioned VLANs 110 and 120 shares the same characteristics, such as the same user-access privileges, network-communication protocols, etc., as the original (unpartitioned) VLAN. More generally, however, the RADIUS service may authenticate the user in one or more VLANs that are not identical, e.g., and were not generated as a result of partitioning an over-subscribed VLAN.

Figure 4:
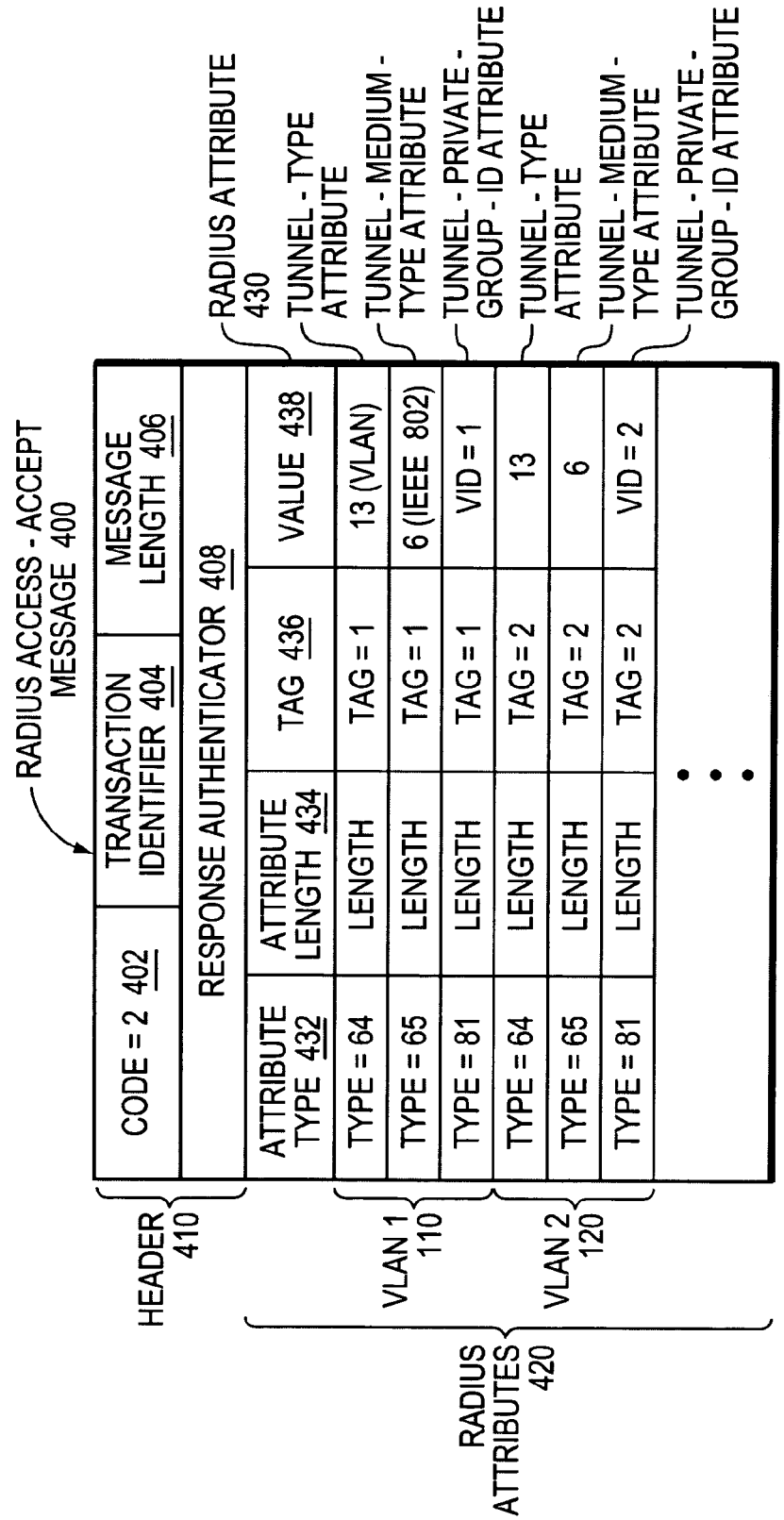
FIG. 4 is a schematic block diagram of an exemplary RADIUS Access-Accept message that specifies one or more different VLANs for an authenticated user.

FIG. 4 illustrates an exemplary RADIUS Access-Accept message 400 identifying one or more VLANs that may be assigned to an authenticated user. The Access-Accept message includes a header section 410 and a RADIUS Attributes section 420. The header section 410 contains a code field 402, a transaction-identifier field 404, a message-length field 406 and a response-authenticator field 408.

The code field 402 stores a value (e.g., equal to two) that identifies the message 400 as an Access-Accept message. The transaction-identifier field 404 stores a value corresponding to a previously-issued Access-Request message (not shown). Thus, the Authenticator PAE 300 can match the Access-Accept message 400 with its associated Access-Request message. The message-length field 406 stores the total number of bytes in the message 400, i.e., including the contents of both the header section 410 and the RADIUS Attributes section 420. The response-authenticator field 408 stores a data integrity check value, such as a hash value, that may be used authenticate the contents of the Access-Accept message 400.

The RADIUS Attributes section 420 contains a set of one or more RADIUS Attributes 430. Each Attribute 430 contains an Attribute type field 432, an Attribute length field 434, a tag field 436, and a value field 438. The Attribute type field 432 stores a value that identifies a particular type of RADIUS Attribute. The length field 434 stores the length (in bytes) of the Attribute 430. The tag field 436 stores a value that may be used to associate the Attribute 430 with a particular VLAN or tunnel. For example, each RADIUS Attribute associated with the VLAN 110, as shown, stores a tag value equal to one. Likewise each Attribute 430 corresponding to the VLAN 120 stores a tag value equal to two. As described in RFC 2868, a tag field value equal to zero indicates that the tag field is not being used. The value field 438 stores a value associated with the Attribute 430.

As noted, the exemplary RADIUS Access-Accept message 400 includes two sets of RADIUS Attributes: one set corresponding to the VLAN 110 and a second set corresponding to the VLAN 120. Each set of Attributes corresponding to a VLAN includes a Tunnel-Type Attribute (type 64), a Tunnel-Medium-Type Attribute (type 65) and a Tunnel-Private-Group-ID Attribute (type 81). Of course, those skilled in the art will appreciate that other Attributes 430, e.g., corresponding to other VLANs, also may be included in the message 400. For example, the Access-Accept message also may contain a Tunnel-Preference Attribute (not shown) identifying a "preferred" VLAN for the authenticated user. In this case, the preferred VLAN may be determined by the RADIUS service based on, e.g., a system administrator's configuration.

For each of the VLANs 110 and 120, the Tunnel-Type Attribute stores a predetermined value, such as 13, indicating that the user who is authenticated by the message 400 is authenticated to participate in the VLAN. The Tunnel-Medium-Type Attribute stores a value indicating the type of transport medium used by the VLAN. For instance, a Tunnel-Medium-Type value equal to six corresponds to a conventional IEEE 802 trans-port medium. The value stored in the Tunnel-Private-Group-ID Attribute is the VID value for the VLAN in which the user has been authenticated. For instance, the VID value corresponding to the VLAN 110 equals one, whereas the VID value for the VLAN 120 equals two.

FIG. 5 illustrates a table 500 containing VLAN statistics for those VLANs managed by the intermediate node 200. The table comprises a plurality of entries 510, each entry pairing a VID value 520 with a corresponding number of users 530. That is, for each VLAN managed by the intermediate node 200, the VLAN's VID value is stored in an appropriate entry 510 and is matched to the number of users participating in that VLAN. For example, as shown, the VLAN having a VID value equal to one contains 17 authenticate users participating in that VLAN; the VLAN corresponding to VID value equal to two has 29 participating users. The table 500 may be modified to store additional and/or alternate statistics associated with each VLAN. For instance, the table also may match a VLAN's VID value 520 with an amount of available bandwidth in the VLAN or a number of users associated with a particular user class in the VLAN.

Each intermediate node 200 maintains its own version of the table 500, e.g., stored in its memory 280. Thus, in some embodiments, an intermediate node's table 500 may store local VLAN statistics dynamically acquired (or "learned") by the intermediate node. Alternatively, the intermediate nodes 200 may share their local statistics with one another to ensure that their respective VLAN statistics tables 500 are consistent across the network. To that end, VLAN statistics may be communicated between intermediate nodes 200 using, e.g., the conventional GARP (Generic Attribute Reservation Protocol) VLAN Registration Protocol (GVRP) or another similar protocol known in the art. In this manner, each of the intermediate nodes' tables 500 may be populated with the same VLAN statistics.

Figure 6:
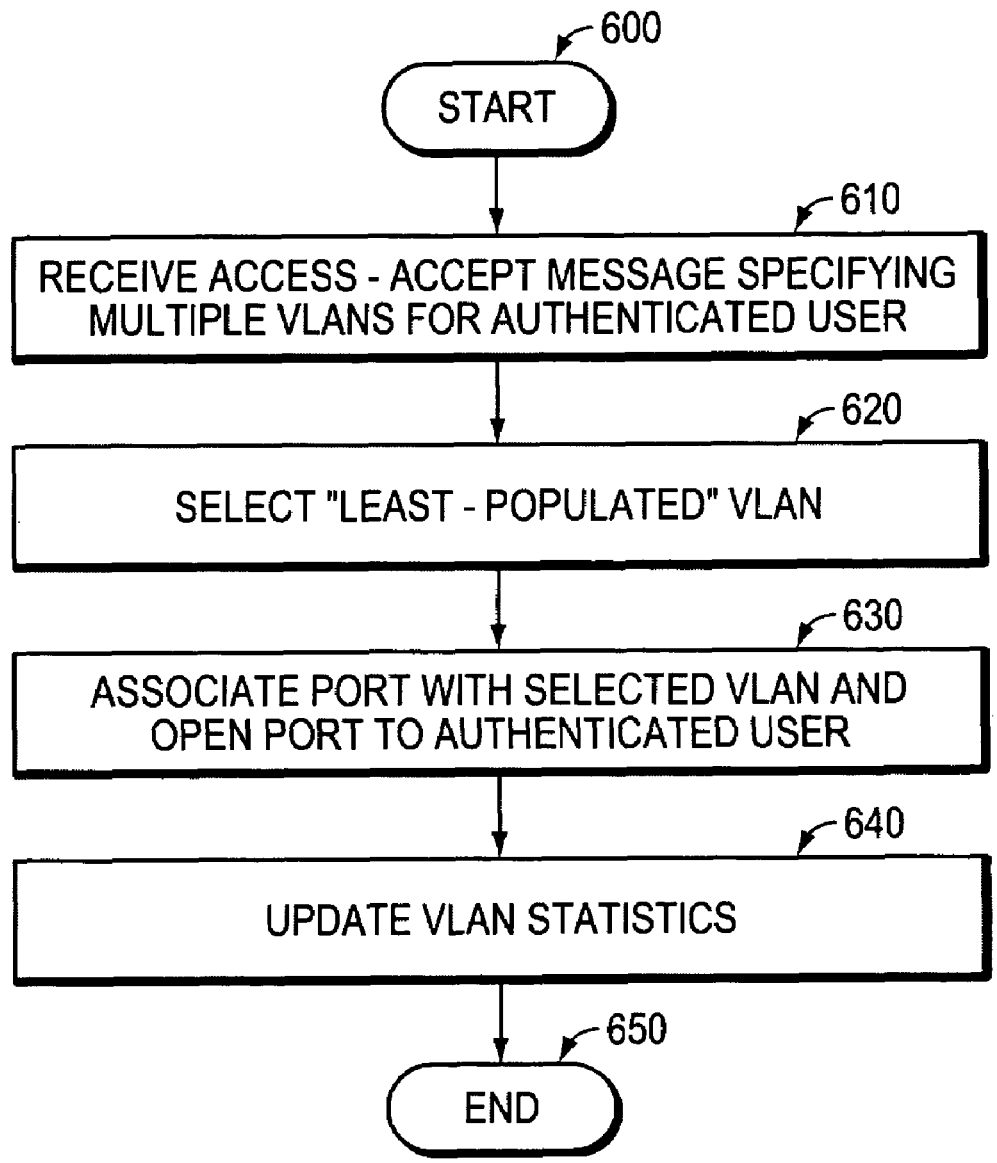
FIG. 6 is a flowchart illustrating a sequence of steps that may be performed to select a VLAN for an authenticated user in accordance with a first illustrative embodiment of the invention.

FIG. 6 is a flowchart illustrating a sequence of steps that may be performed by an Authenticator PAE 300 after receiving the Access-Accept message 400. The sequence begins at step 600 and proceeds to step 610 where the Authenticator PAE receives an Access-Accept message specifying multiple VLANs, e.g., VLANs 110 and 120, for an authenticated user. At step 620, a VLAN-selector process 305 in the Authenticator PAE selects a "least-populated" VLAN among the VLANs specified in the received Access-Accept message. The VLAN may be selected based on a complex function of various user attributes and/or VLAN statistics, e.g., stored in the table 500.

For simplicity, it will be assumed that the least-populated VLAN is selected as the VLAN containing the fewest number of participating users. As such, users are dynamically "load balanced" among the set of VLANs based on the VLANs' user populations. Because the table 500 indicates that the VLANs 110 and 120 (VID values 1 and 2) respectively contain 17 and 29 users, the VLAN 110 is selected by the VLAN-selector process 305 as the least-populated VLAN for the authenticated user. However, it is expressly contemplated that other ways of selecting the user's least-populated VLAN may be employed within the scope of the invention.

Next, at step 630, the Authenticator PAE 300 associates its intermediate-node port 210 with the selected VLAN 110 and "opens" the port to the authenticate user, i.e., so the user may access network services 330 through the port. At step 640, the Authenticator PAE updates VLAN statistics, e.g., stored in its table 500, by incrementing the number of users 530 participating in the selected VLAN 110. The updated statistics may be communicated to other, interconnected intermediate nodes 200, e.g., using the conventional GVRP protocol or the like. The Authenticator PAE also may update any other VLAN statistics stored in the table 500. The sequence ends at step 650.

B. Second Illustrative Embodiment

Again, suppose the RADIUS service 150 has been configured, e.g., by a system administrator, to authenticate a particular user to participate in one or more VLANs, e.g., VLANs 110 and 120. Further assume that the RADIUS service is configured to associate the VLANs 110 and 120 with a single "VLAN group." More specifically, the RADIUS service may logically associate different sets of one or more VLANs with different VLAN groups, where each VLAN group is uniquely identified by a corresponding group identifier (GID). In this case, the RADIUS service may issue an Access-Accept message indicating that the authenticated user may participate in a particular VLAN group.

Illustratively, when an over-subscribed VLAN is partitioned, the resulting smaller VLANs are associated with the same VLAN group. However, it is also expressly contemplated that a VLAN group may comprise a set of one or more VLANs that are not identical, e.g., and were not generated as a result of partitioning an over-subscribed VLAN. Furthermore, those skilled in the art will appreciate that, in some embodiments, a single VLAN may be a member of a plurality of different VLAN groups. For example, a first VLAN group may contain VLANs having VID values equal to {1, 2}, whereas a second VLAN group may contain VLANs whose VID values equal {2, 4, 5}. In this example, the VLAN corresponding to the VID value equal to 2 is logically assigned to both the first and second VLAN groups.

Figure 7:
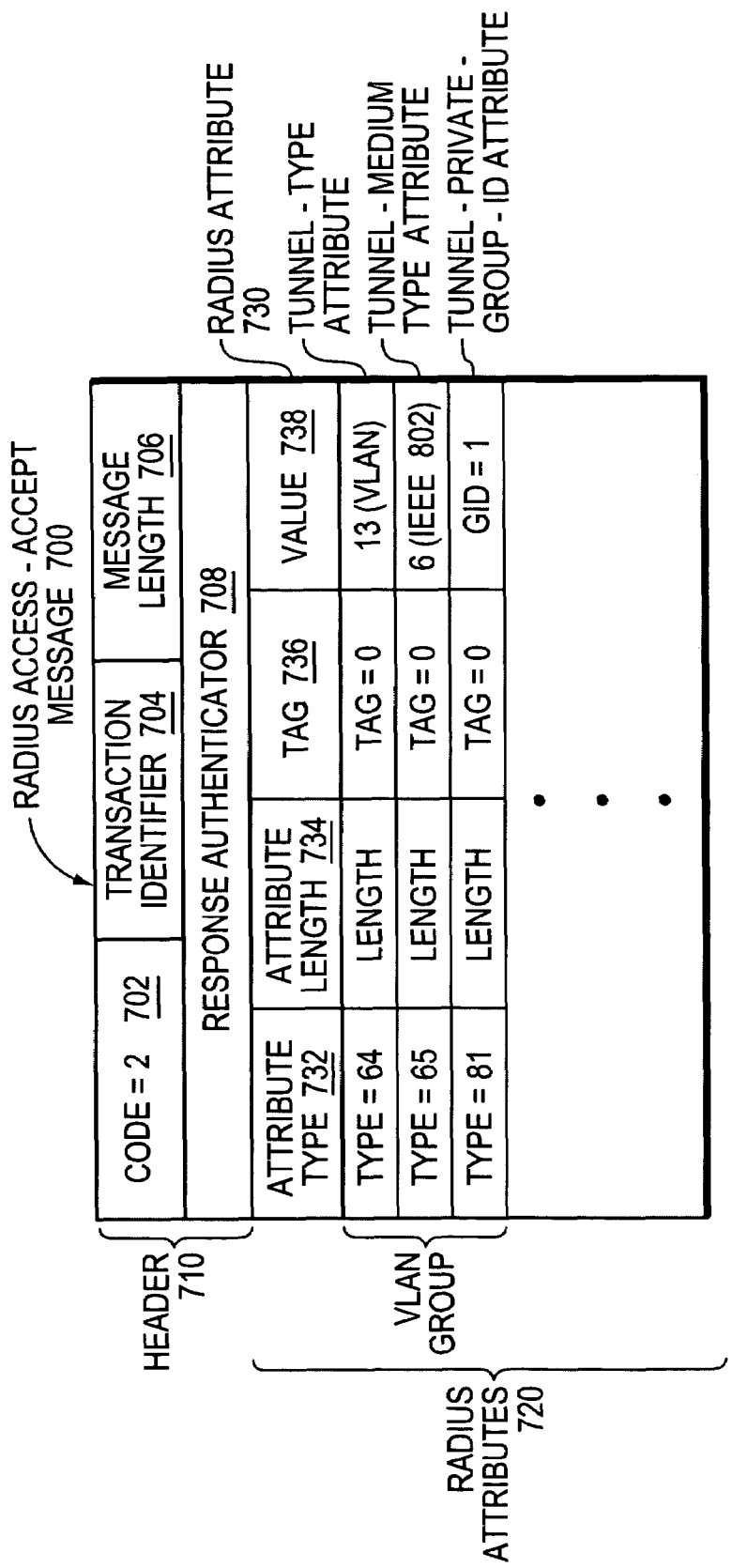
FIG. 7 is a schematic block diagram of an exemplary RADIUS Access-Accept message that specifies a VLAN group containing a set of one or more VLANs associated with an authenticated user.

FIG. 7 illustrates an exemplary RADIUS Access-Accept message 700 identifying a VLAN group whose constituent VLANs may be assigned to an authenticated user. The Access-Accept message includes a header section 710 and a RADIUS Attributes section 720. The header section 710 contains a code field 702, a transaction-identifier field 704, a message-length field 706 and a response-authenticator field 708.

The code field 702 stores a value (e.g., equal to two) that identifies the message 700 as an Access-Accept message. The transaction-identifier field 704 stores a value corresponding to a previously-issued Access-Request message (not shown). Thus, the Authenticator PAE 300 can match the Access-Accept message 700 with its associated Access-Request message. The message-length field 706 stores the total number of bytes in the message 700, i.e., including the contents of both the header section 710 and the RADIUS Attributes section 720. The response-authenticator field 708 stores a data integrity check value, such as a hash value, that may be used authenticate the contents of the Access-Accept message 700.

The RADIUS Attributes section 720 contains a set of one or more RADIUS Attributes 730. Each Attribute 730 contains an Attribute type field 732, an Attribute length field 734, a tag field 736, and a value field 738. The Attribute type field 732 stores a value that identifies a particular type of RADIUS Attribute. The length field 734 stores the length (in bytes) of the Attribute 730. The tag field 736 stores a value that may be used to associate the Attribute 730 with a particular VLAN or tunnel. Since only a single VLAN group is associated with the authenticated user in the exemplary Access-Accept message 700, the value of each tag field 736 is set equal to zero to indicate that the tag field is not being used. The value field 738 stores a value associated with the Attribute 730.

The exemplary RADIUS Access-Accept message 700 includes a set of RADIUS Attributes corresponding to the VLAN group containing VLANs in which the user is authenticated to participate. The set of Attributes includes a Tunnel-Type Attribute (type 64), a Tunnel-Medium-Type Attribute (type 65) and a Tunnel-Private-Group-ID Attribute (type 81). Of course, those skilled in the art will appreciate that other Attributes 730, e.g., corresponding to other VLAN groups, also may be included in the message 700.

The Tunnel-Type Attribute stores a predetermined value, such as 13, indicating that the user who is authenticated by the message 700 is authenticated to participate in a VLAN. The Tunnel-Medium-Type Attribute stores a value indicating the type of trans-port medium used by the VLAN. For instance, a Tunnel-Medium-Type value equal to six corresponds to a conventional IEEE 802 transport medium. The value stored in the Tunnel-Private-Group-ID Attribute is the GID value for the VLAN group in which the user has been authenticated.

FIG. 8 illustrates a table 800 that may be used to map VLAN groups with their constituent VLANs. The table comprises a plurality of entries 810, each entry matching a VLAN GID value 820 with one or more corresponding VID values 830. For example, as shown, a GID value equal to 1 corresponds to a group of VLANs assigned to the VID values equal to 1 and 2. For purposes of discussion, it is assumed that the VID values equal to 1 and 2 respectively correspond to the VLANs 110 and 120. Similarly, the VLAN group associated with GID value equal to 2 includes the VLANs having VID values equal to 2, 4 and 5. The table 800 may be managed by the Authenticator PAE 300 and may be dynamically updated as VLAN groups are created, removed or modified. Preferably, each intermediate node 200 maintains its own version of the table 800, e.g., stored in its memory 280. Accordingly, the contents of VLAN groups may be distributed among a set of intermediate nodes using, e.g., the conventional GVRP protocol. In this manner, each of the intermediate nodes' tables 800 may be populated with the same VLAN group information.

Figure 9:
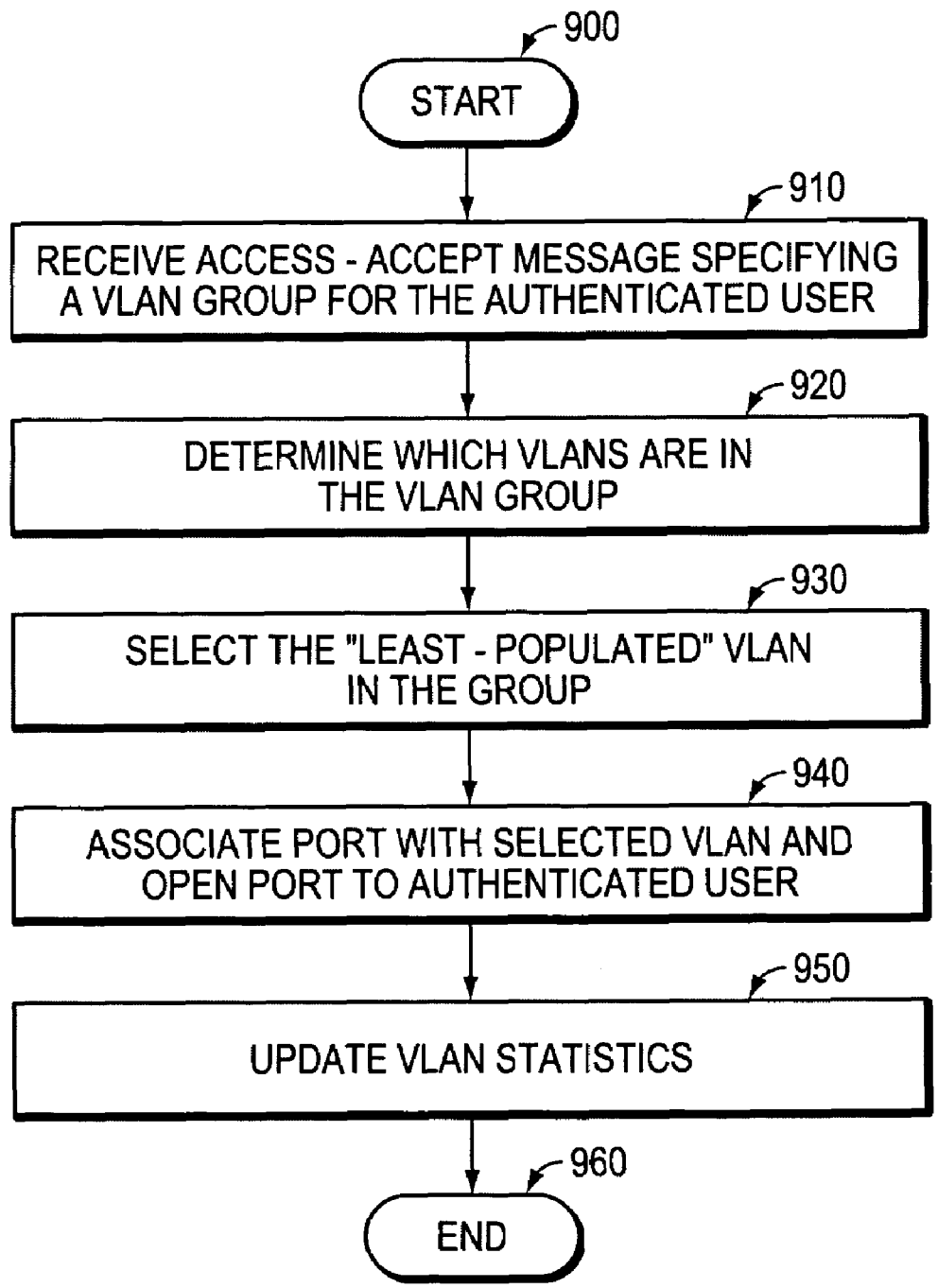
FIG. 9 is a flowchart illustrating a sequence of steps that may be performed to select a VLAN for an authenticated user in accordance with a second illustrative embodiment of the invention.

FIG. 9 is a flowchart illustrating a sequence of steps that an Authenticator PAE 300 may perform after receiving the Access-Accept message 700 from the RADIUS service 150. The sequence starts at step 900 and proceeds to step 910 where the Authenticator PAE receives an Access-Accept message specifying a VLAN group for an authenticated user. At step 920, the Authenticator PAE determines which VLANs are in the specified VLAN group. To that end, the Authenticator PAE may extract a GID value from the Access-Accept message 700 and use the extracted GID value to index a matching entry 810 in the table 800, thereby identifying VID values corresponding to the VLANs in the specified VLAN group.

At step 930, a VLAN-selector process 305 in the Authenticator PAE selects a "least-populated" VLAN among the VLANs in the VLAN group. The least populated VLAN may be selected based on a function of various user attributes and/or VLAN statistics, e.g., stored in the VLAN-statistics table 500. For instance, assume that the least-populated VLAN is selected as the VLAN containing the fewest number of participating users. Thus, the VLAN selector 305 first may identify the VID values 830 associated with GID value extracted from the Access-Accept message 700, then the VLAN selector may lookup the number of users participating in each of the identified VLANs using the table 500. As such, users are dynamically "load balanced" among the set of VLANs based on the VLANs' user populations.

For example, consider the situation where the Access-Accept message indicates that the user is authenticated to participate in a VLAN group having a GID value equal to one. In this hypothetical, the VLAN selector 305 uses the table 800 to determine that the VLAN group contains the VLANs 110 and 120 whose VID values respectively equal one and two. Then, the VLAN selector accesses the table 500 to determine the number of users participating in each of the VLANs 110 and 120. Because the table 500 indicates that the VLANs 110 and 120 (VID values 1 and 2) respectively contain 17 and 29 users, the VLAN 110 is selected by the VLAN-selector process 305 as the least-populated VLAN for the authenticated user. Of course, it is expressly contemplated that other ways of selecting the user's least-populated VLAN may be employed within the scope of the invention.

At step 940, the Authenticator PAE 300 associates its intermediate-node port 210 with the selected VLAN 110 and "opens" the port to the authenticate user, i.e., so the user may access network services 330 through the port. Then, at step 950, the Authenticator PAE updates VLAN statistics, e.g., stored in its table 500, by incrementing the number of users 530 participating in the selected VLAN 110. The updated statistics may be communicated to other, interconnected intermediate nodes 200, e.g., using the conventional GVRP protocol or the like. The Authenticator PAE also may update any other VLAN statistics stored in the table 500. The sequence ends at step 960.

The foregoing has been a detailed description of illustrative embodiments of the invention. Various modifications and additions can be made without departing from the spirit and scope of the invention. For example, while the IEEE 802.1X port-authentication protocol generally permits only a single client node 130 to access an intermediate-node port 210, those skilled in the art will appreciate that the embodiments herein may be advantageous even when a plurality of client nodes are attached to an intermediate-node port, e.g., by an internal or external hub device. Further, the tables 500 and 800 may be replaced with other searchable data structures, such as search trees or linked lists, without loss of generality. In addition, the tables 500 and/or 800 may be stored in other memory locations, e.g., on a physical port, rather than being stored in the intermediate node's "main" memory 280.

It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A method for optimizing distribution of authenticated users among a plurality of broadcast domains, the method comprising:
   determining two or more broadcast domains in which a user is authenticated to participate;
   selecting a least-populated broadcast domain from among the two or more broadcast domains in which the user is authenticated to participate; and
   assigning the user to the selected broadcast domain.

2. The method of claim 1, wherein the step of selecting a least-populated broadcast domain further comprises:
   determining the least-populated broadcast domain based on at least one of: (i) a number of users already participating in the two or more broadcast domains, (ii) available bandwidth in the two or more broadcast domains and (iii) user classes associated with users participating in the two or more broadcast domains.

3. The method of claim 1, wherein the broadcast domains are virtual local area networks (VLAN).

4. The method of claim 1, wherein the step of determining the two or more broadcast domains further comprises:
   identifying the two or more broadcast domains using RADIUS Attributes contained in an Access-Accept message issued by a RADIUS service.

5. The method of claim 4, further comprising:
   extracting from the RADIUS Attributes a set of VLAN identifier (VID) values associated with the two or more broadcast domains.

6. The method of claim 1, wherein the step of determining the two or more broadcast domains further comprises:
   identifying at least one logical group of broadcast domains associated with the authenticated user; and
   determining two or more broadcast domains associated with the at least one logical group of broadcast domains.

7. The method of claim 6, further comprising:
   associating a separate group identifier (GID) value with each logical group of broadcast domains.

8. The method of claim 7, further comprising:
   extracting a GID value from a RADIUS Attribute contained in an Access-Accept message issued by a RADIUS service.

9. The method of claim 1, wherein the method is implemented by an Authenticator port access entity (PAE) configured to perform 802.1X port-based network access control.

10. The method of claim 9, wherein the Authenticator PAE executes at a port of an intermediate node.

11. An apparatus for optimizing distribution of authenticated users among a plurality of broadcast domains, the method comprising:
   means for determining two or more broadcast domains in which a user is authenticated to participate;
   means for selecting a least-populated broadcast domain from among the two or more broadcast domains in which the user is authenticated to participate; and means for assigning the user to the selected broadcast domain.

12. The apparatus of claim 11, further comprising:
means for determining the least-populated broadcast domain based on at least one of: (i) a number of users already participating in the two or more broadcast domains, (ii) the available bandwidth in the two or more broadcast domains and (iii) user classes associated with users participating in the two or more broadcast domains.

13. The apparatus of claim 11, wherein the broadcast domains are virtual local area networks (VLAN).

14. The apparatus of claim 11, wherein the means for determining the two or more broadcast domains further comprises:
means for identifying at least one logical group of broadcast domains associated with the authenticated user; and
means for determining two or more broadcast domains associated with the at least one logical group of broadcast domains.

15. An intermediate node adapted to optimize distribution of authenticated users among a plurality of broadcast domains, the intermediate node comprising:
a port configured to provide a user with access to a broadcast domain; and
an Authenticator port access entity (PAE) configured to enable the user to access the broadcast domain through the port, the Authenticator PAE further configured to:
determine two or more broadcast domains in which the user is authenticated to participate;
select a least-populated broadcast domain from among the two or more broadcast domains in which the user is authenticated to participate; and
enable the user to participate in the selected broadcast domain through the port.

16. The intermediate node of claim 15, wherein the Authenticator PAE is further configured to associate the selected broadcast domain with the port.

17. The intermediate node of claim 15, wherein the Authenticator PAE is further configured to determine the least-populated broadcast domain based on at least one of: (i) a number of users already participating in the two or more broadcast domains, (ii) available bandwidth in the two or more broadcast domains and (iii) user classes associated with users participating in the two or more broadcast domains.

18. The intermediate node of claim 15, wherein the broadcast domains are virtual local area networks (VLAN).

19. The intermediate node of claim 15, wherein the Authenticator PAE is further configured to:
identify at least one logical group of broadcast domains associated with the authenticated user; and
determine two or more broadcast domains associated with the at least one logical group of broadcast domains.

20. A network node, comprising:
a processing element; and
a memory configured to store instructions executable by the processing element, the instructions to optimize distribution of authenticated users among a plurality of broadcast domains, the instructions when executed operable to:
determine two or more broadcast domains in which a user is authenticated to participate;
select a least-populated broadcast domain from among the two or more broadcast domains in which the user is authenticated to participate; and
assign the user to the selected broadcast domain.

21. The network node of claim 20, wherein the broadcast domains are virtual local area networks (VLAN).

22. The network node of claim 20, wherein the instructions to select a least-populated broadcast domain further comprise instructions when executed operable to:
determine the least-populated broadcast domain based on at least one of: (i) a number of users already participating in the two or more broadcast domains, (ii) available bandwidth in the two or more broadcast domains and (iii) user classes associated with users participating in the two or more broadcast domains.

23. The network node of claim 20, wherein the instructions further comprise instructions when executed operable to:
identify at least one logical group of broadcast domains associated with the authenticated user; and
determine two or more broadcast domains associated with the at least one logical group of broadcast domains.

* * * * *